US008958681B2

(12) United States Patent
Ripplinger

(10) Patent No.: US 8,958,681 B2
(45) Date of Patent: Feb. 17, 2015

(54) CABLE ROLLER

(71) Applicant: Greenlee Textron Inc., Rockford, IL (US)

(72) Inventor: Skyler Ripplinger, Rockford, IL (US)

(73) Assignee: Greenlee Textron Inc., Rockford, IL (US)

( * ) Notice: Subject to any disclaimer, the term of this patent is extended or adjusted under 35 U.S.C. 154(b) by 72 days.

(21) Appl. No.: 13/795,434

(22) Filed: Mar. 12, 2013

(65) Prior Publication Data
US 2014/0270673 A1   Sep. 18, 2014

(51) Int. Cl.
G02B 6/00 (2006.01)
G02B 6/46 (2006.01)
G02B 6/48 (2006.01)
G02B 6/54 (2006.01)
G02B 6/50 (2006.01)

(52) U.S. Cl.
CPC .. *G02B 6/46* (2013.01); *G02B 6/48* (2013.01); *G02B 6/508* (2013.01); *G02B 6/50* (2013.01); *G02B 6/54* (2013.01)
USPC .......................................... 385/147; 385/136

(58) Field of Classification Search
CPC ............ G02B 6/46; G02B 6/48; G02B 6/483; G02B 6/50; G02B 6/508; G02B 6/54
See application file for complete search history.

(56) References Cited

U.S. PATENT DOCUMENTS

| 3,602,467 | A  | * | 8/1971 | Thomas ........................... 248/55 |
|---|---|---|---|---|
| 3,637,175 | A  | * | 1/1972 | McElroy .......................... 248/55 |
| 3,941,341 | A  | * | 3/1976 | Brogdon, Jr. ................... 248/55 |
| 6,109,561 | A  | * | 8/2000 | Haines ........................ 242/615.2 |
| 8,246,009 | B2 | * | 8/2012 | Plummer .............. 254/134.3 FT |
| 2014/0150687 | A1 | * | 6/2014 | Shaw et al. ................. 105/329.1 |
| 2014/0270673 | A1 | * | 9/2014 | Ripplinger ................... 385/135 |

OTHER PUBLICATIONS http://www.eberliron.com/store/category/Unistruct_Pipe_and_Conduit_Clamps/106 . . . , 2013.
http://greenlee-media.precis5.com/996009f2374006606f4c0b0fda878af1, 2013.
http://ecx.images-amazon.com/images/I/41aQ22ryPDL.jpg, 2013.
http://t1.gstatic.com/images?q=tbn:ANd9GcSIMAO0qFSRv2j05K2UOO2cldinTdb7 . . . , 2013.
http://www.fwbrental.com/images/2018r.gif, 2013.
http://www.fwbrental.com/cablepulling.php, 2013.
Instruction Manual Greenlee CR100 Heavy-duty Cable Roller, copyright 2010 Greenlee Textron Inc., 2010.
Instruction Manual Greenlee CR25 Cable Roller Guide, copyright 2005 Greenlee Textron Inc., 2005.
www.anemo.eu—Camloc Quick-Operating Fasteners Release Feb. 2008 Anemo Engineering Bvba.

* cited by examiner

*Primary Examiner* — Rhonda Peace
(74) *Attorney, Agent, or Firm* — Klintworth & Rozenblat IP LLC

(57) ABSTRACT

A cable roller for use in positioning a cable relative to a cable tray or relative to a ceiling of a building includes a mounting channel, a support assembly attached thereto which is moveable relative to the mounting channel, and at least one roller attached to the support assembly for allowing the cable to roll thereover. The support assembly can be moved from a closed position to an open position to allow for the easy removal of the cable from the cable roller.

18 Claims, 5 Drawing Sheets

US 8,958,681 B2

CABLE ROLLER

FIELD OF THE INVENTION

The present invention relates to a cable roller to allow a user to easily install and position cable in a cable tray or in a channel mounted on the ceiling of a building.

BACKGROUND OF THE INVENTION

Cable trays are commonly used in industrial-type building for routing cable. The cable lays on top of the cable tray and is visible. The cable can be easily changed and additional cables can be easily added. Alternatively, mounting channels are mounted on the ceiling of the building and the cables are attached by pipe clamps to the mounting channel.

When pulling cables into an industrial cable tray, a guide system is required to control the cable location since a full enclosure (conduit) is not provided. Current guide systems mount to the tray of the cable tray and are fixed in place.

Prior art cable rollers include the Greenlee Textron 2018S, 2018R family of products. These types of cable rollers mount to the tray and are placed directly on or directly below the tray. The cable roller has rollers over which the cable rolls as it is being pulled along the cable tray. Once the cable pull is completed, if the cable roller is resting on top of the tray, significant user time is necessary to remove the roller to place the cable into its final resting spot. Once the cable pull is completed, if the cable roller is mounted below the tray, the cable can be removed from the cable roller without disassembly, but significant user time is still needed to position the cable since the rollers are in a fixed location.

A cable roller is provided herein to provide for the easy installation and positioning of cable in a cable tray. Features and advantages of the present cable roller will become apparent upon a reading of the attached specification, in combination with a study of the drawings.

SUMMARY OF THE INVENTION

A cable roller for providing for the easy installation and positioning of cable relative to a cable tray or relative to a ceiling of a building is disclosed. The cable roller includes a mounting channel, a support assembly attached thereto which is moveable relative to the mounting channel, and at least one roller attached to the support assembly for allowing the cable to roll thereover. The support assembly can be moved from a closed position to an open position to allow for the easy removal of the cable from the cable roller.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 8 is a perspective view of a portion of the cable roller and a portion of the cable tray showing the attachment there between;

DETAILED DESCRIPTION OF THE ILLUSTRATED EMBODIMENTS

Figure 1:
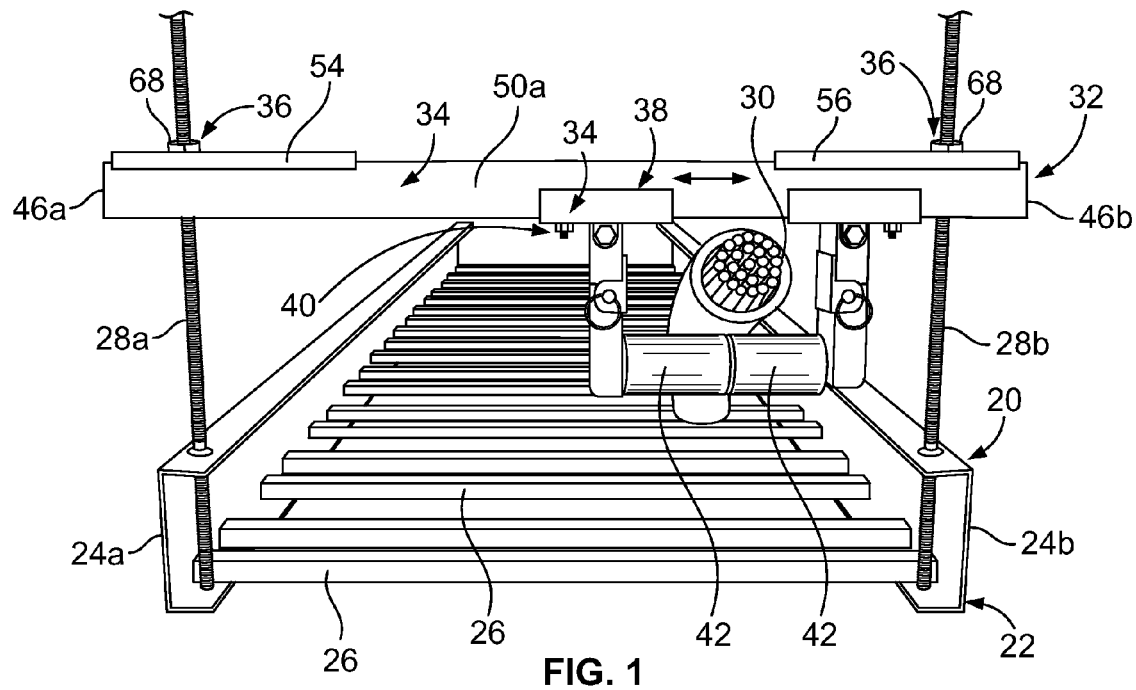
FIG. 1 is a perspective view of a cable roller which incorporates the features of the present invention, along with a cable and the cable tray into which the cable is installed.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

Figure 2:
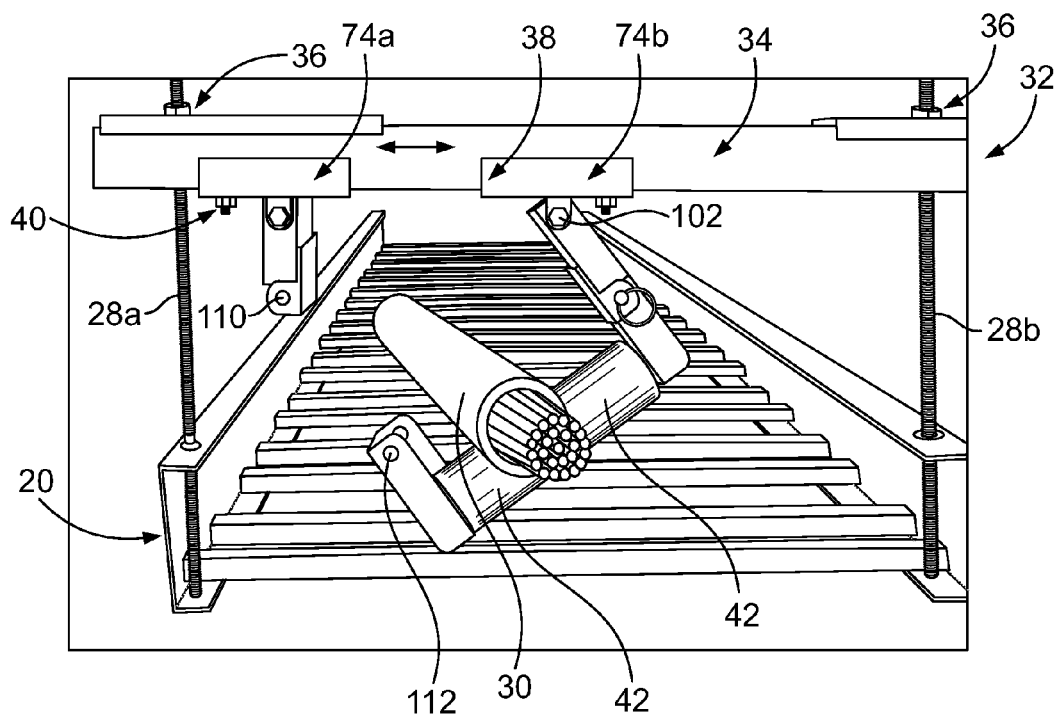
FIG. 2 is a perspective view of the cable roller, cable and cable tray, showing the cable roller in an open position.
Figure 3:
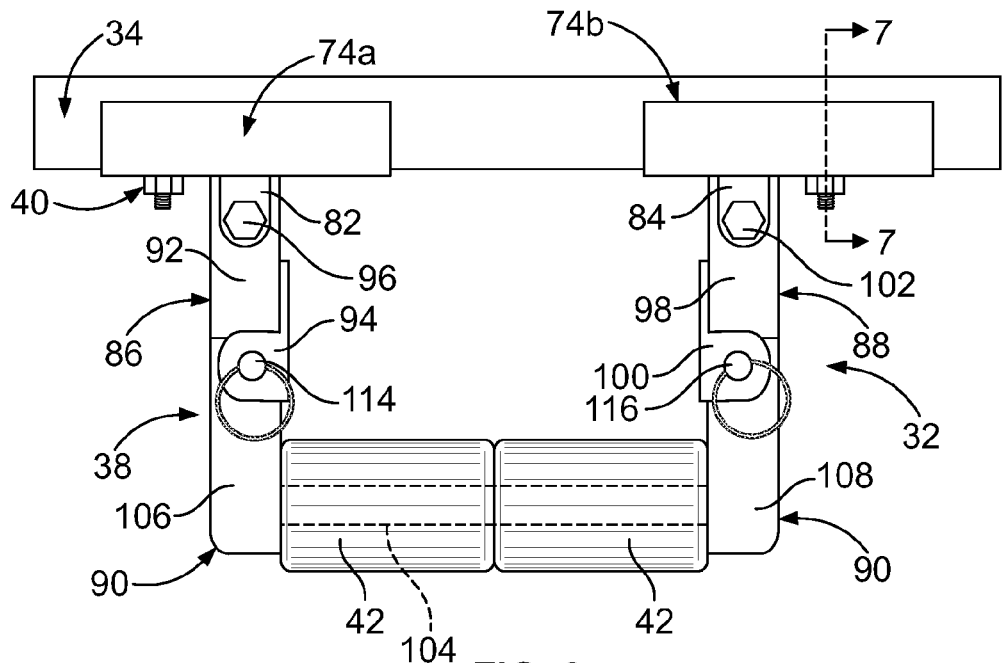
FIG. 3 is a side elevation view of the cable roller in a closed position.
Figure 4:
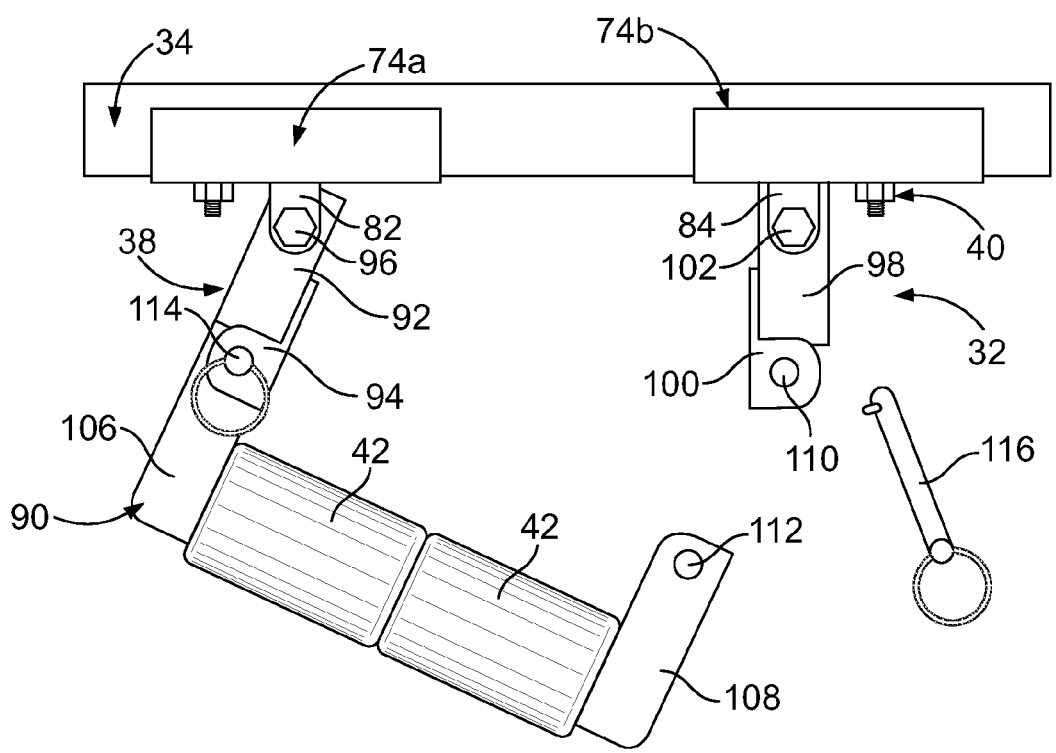
FIG. 4 is a side elevation view of the cable roller in an open position.

As is known in the art, industrial cable trays 20 can be formed of a ladder-type rack having a base 22 formed of a pair of rails 24a, 24b with a plurality of spaced apart crossbars 26 extending between the rails 24a, 26b (as shown in FIGS. 1 and 2), or formed of a mesh (not shown). The base 22 is hung from the ceiling of a building by several pairs of spaced apart tray hangers 28a, 28b, formed of threaded rods, which are attached to the base 22. Cable 30 is laid on top of the base 22 for routing through the building. Cable trays 20 are commonly formed out of aluminum or fiberglass. As is known in the art, cable trays 20 can be used instead of conduit.

The cable roller 32 cable roller 32 of the present invention provides for the easy installation of cable 30 in the cable tray 20. The cable roller 32 is installed in a suspended position above the base 22 of the cable tray 20 to simplify and speed the installation of cable 30 in the cable tray 20. The cable roller 32 includes a mounting channel 34 attached to the tray hangers 28a, 28b by a coupling assembly 36, a support assembly 38 attached to the mounting channel 34 by a connector assembly 40, and at least one roller 42 attached to the support assembly 38. Each of the components of the cable roller 32 are preferably made of metal, but could be formed of high strength plastics or composites.

The mounting channel 34 is generally U-shaped having a base wall 44 with opposite ends 46a, 46b, an upper surface 48a and a lower surface 4b8, first and second side walls 50a, 50b depending perpendicularly downwardly from the lower surface 48b at the opposite edges of the base wall 44, a first mounting wall 52a extending perpendicularly to the first side wall 50a, a second mounting wall 52b extending perpendicularly to the second side wall 50b, a first pair of guide rails 54 extending from the upper surface 48a of the base wall 44 at the opposite edges thereof at end 46a, and a second pair of guide rails 56 extends from the upper surface 48a of the base wall 44 at the opposite edges thereof at end 46b. The base wall 44, first and second side walls 50a, 50b and the first and second mounting walls 52a, 52b define a cavity 56. The free ends of the first and second mounting walls 52a, 52b face each other and are spaced apart from each other to form a gap 58.

Each of the first and second mounting walls 52a, 52b have a retention protrusion 60a, 60b extending upwardly therefrom. An elongated slot 62 is provided at each end of the base wall 44 and extends from the respective end 46a, 46b of the base wall 44 a predetermined distance. The first pair of guide rails 54 extend from the end 46a of the base wall 44 past the end of its respective slot 62. The second pair of guide 56 rails extend from the end 46b of the base wall 44 past the end of its respective slot 62. Each guide rail 54, 56 has a recess defined by the guide rail 54, 56. Such a mounting channel 34 is commonly sold under the trade name UNISTRUT® (such commonly sold channel has been modified for this invention to include the slots 62).

Figure 8:
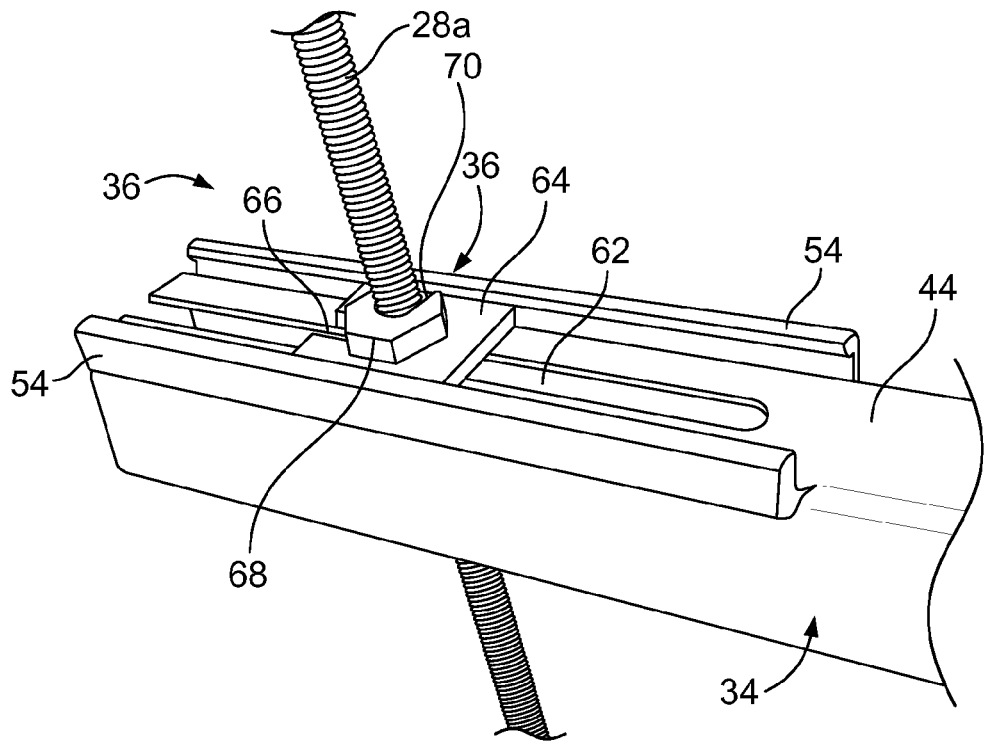

The coupling assemblies 36 are used to quickly and easily attach the mounting channel 34 to the tray hangers 28a, 28b, and the coupling assemblies 36 may take a variety of forms. The coupling assembly 36 is shown and described with regard to guide rails 54 and tray hanger 28a in FIG. 8, but it is to be understood that the coupling assembly 36 is identically formed for use with guide rails 56 and tray hanger 28b. As shown in FIG. 8, the coupling assembly 46 takes the form of a commercially available ¼ turn fastener installed into the guide rails 54 to mount the mounting channel 34 to the tray hanger 28a. Each fastener includes a plate 64 having a slot 66 therein, and a nut 68 which is rotatable relative to the plate 64, but not releasable from the plate 64. The nut 68 has a threaded slot 70 which can be aligned with slot 66, or can be rotated out of alignment with slot 66. The plate 64 seats in the recesses of the guide rails 56 to constrain movement of the fastener in the top and bottom directions, but the fastener is free to slide axially relative to the slot 62.

To use the coupling assemblies 36, one tray hanger, for example tray hanger 28a, is inserted into its slot 62, into the slot 66 in the plate 64 and into the slot 70 in the nut 68. The nut 68 is then turned a quarter turn to engage the threads and capture the tray hanger 28a therein, The mounting channel 34 is slid relative to the tray hanger 28a to allow sufficient room for the other tray hanger 28b to enter into the opposing slot 62 and engage the other coupling assembly 36. The fastener associated with tray hanger 28b is engaged with tray hanger 28b in the same manner as the fastener associated with tray hanger 28a. The mounting channel 34 is then slid relative to the tray hangers 28a, 28b to centrally position the mounting channel 34 over the cable tray 20. The plates 64 are held by the guide rails 54, 56. This allows for a wide range of width adjustment and easy installation onto the tray hangers 28a, 28b. The length of the slot 62 and the mounting channel 34 can be selected to allow a wide variance in cable tray 20 widths. A lock (not shown), for example a cotter pin or a brake, can be provided to lock the mounting channel 34 into the desired position relative to the tray hangers 28a, 28b.

Figure 9:
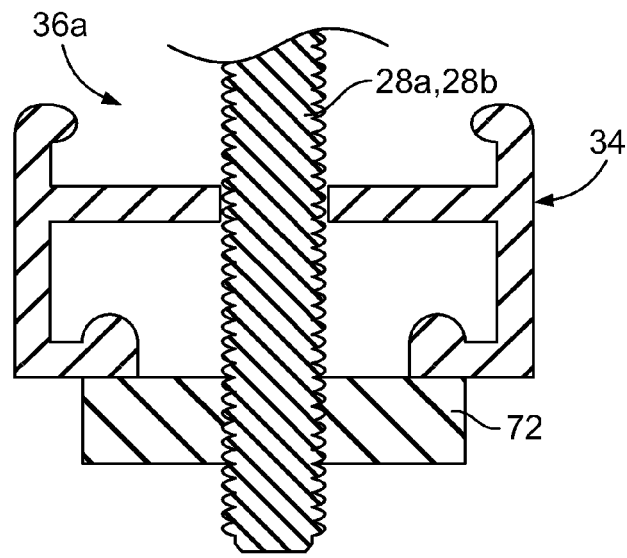
FIG. 9 a cross-sectional view of an alternate coupling assembly.

An alternate coupling assembly 36a is shown in FIG. 9. This coupling assembly 36a provides a structure 72, such as nuts permanently mounted on the tray hangers 28, 28b or a removable clamp engaged with the tray hangers 28, 28b, upon which the mounting channel 34 sits. Other means of coupling are within the scope of the present invention.

Figure 5:
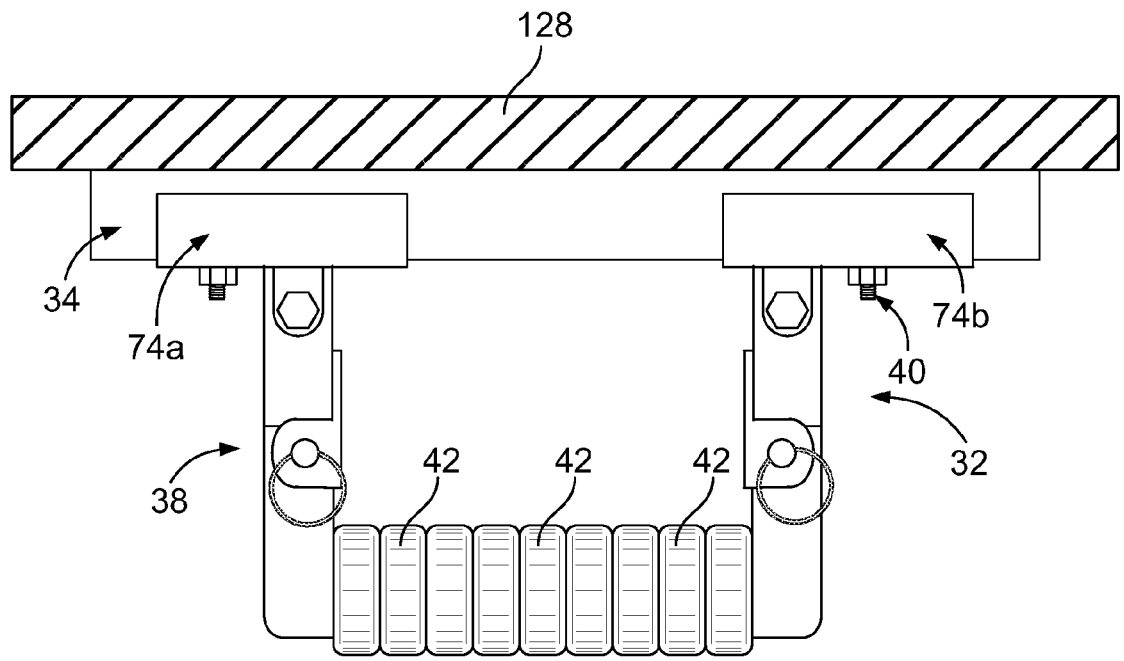
FIG. 5 is a side elevation view of an alternate embodiment of the cable roller which incorporates the features of the present invention in a closed position.
Figure 6:
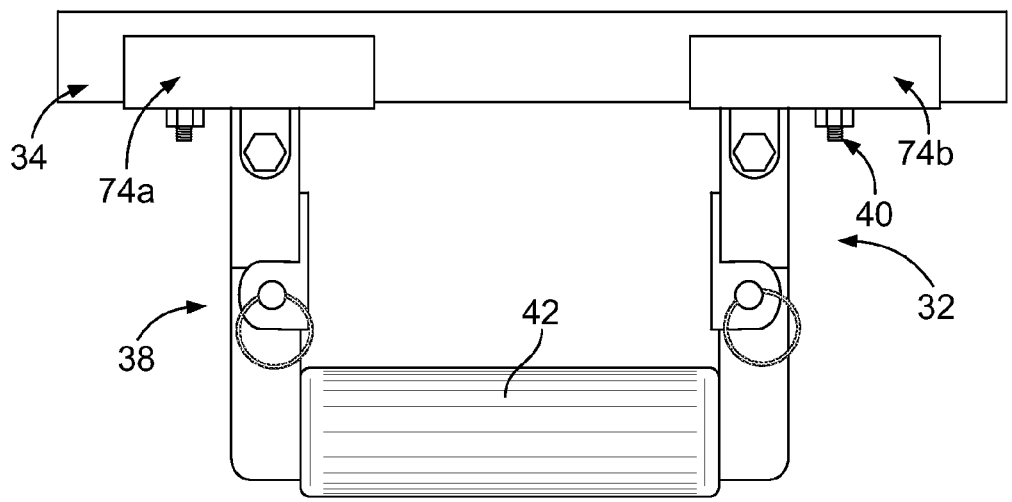
FIG. 6 is a side elevation view of the cable roller in a closed position and shown attached to a ceiling.
Figure 7:
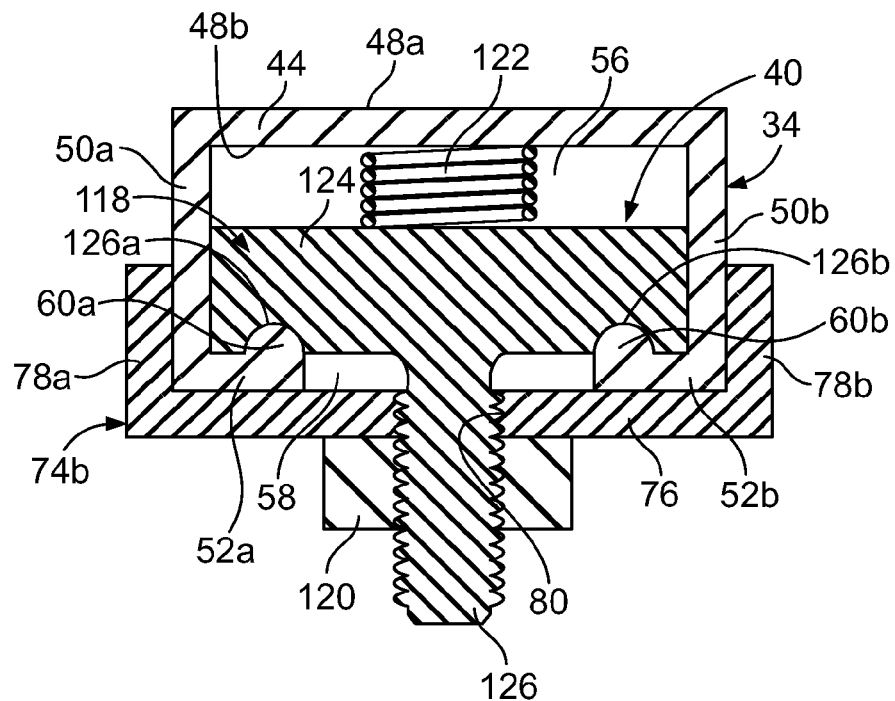
FIG. 7 is a cross-sectional view through line 7-7 of FIG. 4.

The support assembly 38 includes a pair of generally U-shaped support channels 74a, 74b, a first leg assembly 86 extending downwardly from the support channel 74a, a second leg assembly 88 extending downwardly from the support channel 74b, and a cross-bar 90 extending between the leg assemblies 86, 88. The roller(s) 42 is supported on the cross-bar 90 and is free to rotate relative to the cross-bar 90 and relative to the leg assemblies 86, 88. A plurality of side-by-side rollers 42 can be provided as shown in FIGS. 1-5, or a single roller 42 can be provided as shown in FIG. 6. The roller(s) 42 may have ball bearings therein to ease rotation around the cross-bar 90, and is made of a suitable material, such as metal or plastic. The support assembly 38 and roller(s) define an opening Each support channel 74a, 74b is identically formed and the specifics of the support channel 74a, 74b are shown and described with respect to support channel 74b as shown in FIG. 7. Support channel 74b has a base wall 76, first and second side walls 78a, 78b extending upwardly and perpendicularly from the opposite edges of the base wall 76. The base wall 76 and the first and second side walls 78a, 78b define a cavity. A pair of spaced apart apertures 80 are provided through the base wall 76; with one of the apertures 80 being proximate to one end of the base wall 76 and the other aperture 80 being proximate to the other end of the base wall 76. A first pair of spaced apart flanges 82 extend downwardly from the base wall 76 and preferably align with the respective side walls 78a, 78b. Each flange 82 has an aperture provided therethrough and the apertures are aligned with each other. The flanges 82 are preferably located proximate to the one end of the base wall 76. A second pair of flanges 84 extend downwardly from the base wall 76 and preferably align with the respective side walls 78a, 78b. Each flange 84 has an aperture provided therethrough and the apertures are aligned with each other. The flanges 84 are preferably located proximate to the other end of the base wall 76. The first set of flanges 82 and the second set of flanges 84 are spaced apart from each other along the length of the base wall 76, and preferably, each set of flanges 82, 84 is positioned between the apertures 80.

The support channels 74a, 74b and the mounting channel 34 are interengaged and the support channel 74a, 74b seat underneath the mounting channel 34. In each support channel 74a, 74b, side wall 78a engages with side wall 50a; side wall 78b engages with side wall 50b. In each support channel 74a, 74b, the base wall 76 engages with mounting walls 52a, 52b and the aperture 80 aligns with the gap 58.

The first leg assembly 86 includes a leg 92 and a coupler 94. The leg 92 has an upper end having a passageway therethrough, and a lower end. The upper end of the leg 92 seats between the flanges 82 of the support channel 74a and is pivotally connected thereto by a hinge pin 96 which extends through the passageway in the leg 92 and the apertures in the flanges 82. The coupler 94 is affixed to the lower end of the leg 92, such as by fasteners or welding, and has an aperture 110 therethrough. The leg 92 can take a variety of forms, such as a single wall or a U-shaped channel. The leg 92 and the coupler 94 can be formed as a single component.

The second depending leg assembly 88 includes a leg 98 and coupler 100. The leg 98 has an upper end having a passageway therethrough, and a lower end. The upper end of the leg 98 seats between the flanges 84 of the support channel 74b and is pivotally connected thereto by a hinge pin 102 which extends through the passageway in the leg 98 and the apertures in the flanges 84. The coupler 100 is affixed to the lower end of the leg 98, such as by fasteners or welding, and has an aperture 110 therethrough. The leg 98 can take a variety of forms, such as a single wall or a U-shaped channel. The leg 98 and the coupler 100 can be formed as a single component.

The cross-bar 90 has a cylindrical rod 104 having opposite threaded ends, and first and second legs 106, 108 extending perpendicularly from the opposite ends of the rod 104. The lower end of each leg 106, 108 has an aperture through which the respective threaded end of the rod 104 extends. The threaded ends of the rod 104 are attached to the legs 106, 108 by fasteners, such as nuts. The upper end of each leg 106, 108 has an aperture 112 therethrough which aligns with the aperture 110 in the respective coupler 94, 100 when the legs 106, 108 and the couplers 94, 100 are mated together as described herein. A pin 114, 116, such as a cotter pin or other removable attachment, is mounted through the aligned apertures to connect the respective leg 106, 108 and the respective coupler 94, 100 together. When the respective legs 106, 108 and couplers 94, 100 are connected together, each leg assembly 86, 88 is straight. It is to be understood that the coupler 94, 100 can instead be affixed to the leg 106, 108 of the cross-bar 90, with the aperture 112 through the leg 92, 98 of the leg assembly 86, 88. The legs 106, 108 can take a variety of forms, such as a single wall or a U-shaped channel.

The roller(s) 42 is supported on the rod 104 of the cross-bar 90 and is mounted between the legs 106, 108. The roller(s) 42 is free to rotate relative to the cross-bar 90.

The connector assembly 40 is also commonly sold under the trade name UNISTRUT®. The connector assembly 40 is mounted in the cavity 56 in the mounting channel 34, extends through the gap 58 in the mounting channel 34, and extends through the aperture 80 in the respective support channel 74a, 74b. The connector assembly 40 includes a pair of threaded stud nuts 118, a fastener 120, such as a nut, for engaging each stud nut 118, and may include a pair of springs 122. Each stud nut 118 has an enlarged head 124 and as threaded stem 126 extending from the head 124. Each head 124 has a pair of recesses 126a, 126b which mate with the retention protrusions 60a, 60b on the mounting channel 34. Each head 124 seats within the cavity 56 and the stem 126 extends through the gap 58 in the mounting channel 34, and extends through the aperture 80 in the respective support channel 74a, 74b. Each spring 122, if provided, aids in biasing the respective stud nut 118 into engagement with the mounting channel 34. Each fastener 120 is engaged with the respective stem 126 and tightened until the fastener 120 engages against the bottom of the base wall 76 of the respective support channel 74a, 74b. This tightening of the fasteners 120 secures the mounting channel 34, the support channels 74a, 74b and the stud nuts 118 together. When the fasteners 120 are loosened on the respective stems 126, the stud nuts 118 can be slid axially along the cavity 56 in the mounting channel 34, In use, the user feeds the cable 30 between the leg assemblies 86, 88 such that the cable 30 contacts the roller(s) 42. The roller(s) 42 rotates as the cable 30 is pulled over top of the roller(s) 42 to aid in translating the cable 30 along the length of the cable tray 20.

The cable 30 can either be fed into the cable roller 32 when the support assembly 38 in its closed position as shown in FIG. 1, or in its open position as shown in FIG. 2.

When in the closed position, the cable 30 is feed through the opening formed by the support channels 74a, 74b, the leg assemblies 86, 88 and the cross-bar 90.

Opening the cable roller 32 is first described with respect to separating the first leg assembly 86 from the cross-bar 90. To open the cable roller 32 in this manner, the pin 114 is removed, thereby removing the connection between the coupler 94 and the leg 106. The cross-bar 90, roller(s) 42, and the second leg assembly 88 remain attached to each other and pivot around hinge 102. The cable 30 can be easily lifted over the leg 106 to rest on the roller(s) 42. Thereafter, the cable roller 32 is moved to its closed position by pivoting the cross-bar 90, roller(s) 42, and the second leg assembly 88 around hinge 102 until the pin 114 can be reinserted into the aligned apertures 110, 112 in the coupler 94 and the leg 106. Opening the cable roller 32 is next described with respect to separating the second leg assembly 88 from the cross-bar 90. To open the cable roller 32 in this manner, the pin 116 is removed, thereby removing the connection between the coupler 100 and the leg 108. The cross-bar 90, roller(s) 42, and the first leg assembly 86 remain attached to each other and pivot around hinge 96. The cable 30 can be easily lifted over the leg 108 to rest on the roller(s) 42. Thereafter, the cable roller 32 is moved to its closed position by pivoting the cross-bar 90, roller(s) 42, and the first leg assembly 86 around hinge 96 until the pin 112 can be reinserted into the aligned apertures 110, 112 in the coupler 100 and the leg 108.

The position of the support assembly 38 and roller(s) 42 can be adjusted relative to the mounting channel 34 by loosening the fasteners 120 on the threaded stems 126 of the stud nuts 118. This positioning can be effected before or after the insertion of the cable 30 into the cable roller 32. When the pressure from the fasteners 120 is released, the stud nuts 118 can moved axially along the length of the mounting channel 34 to reposition the support assembly 38 and roller(s) 42 in their new desired location. The support assembly 38 and roller(s) 42 can be positioned at any desired location along the length of the mounting channel 34. This enables the user to easily position the cable 30 in the desired location on the cable tray 20. After the desired location is reached, the user retightens the fasteners 120 to fix the support assembly 38 and roller(s) 42 into position relative to the mounting channel 34.

Once the cable 30 is properly located, the user moves the cable roller 32 to its open position as shown in FIG. 2 and as described above to easily remove the cable 30 from the cable roller 32 and to place the cable 30 in the cable tray 20.

The cable roller 32 can be easily disassembled from the cable tray 20 by disengaging the coupling assembly 36 from the threaded tray hangers 28a, 28b and sliding the tray hangers 28a, 28b out from the slots 62 in the mounting channel 34.

Figure 10:
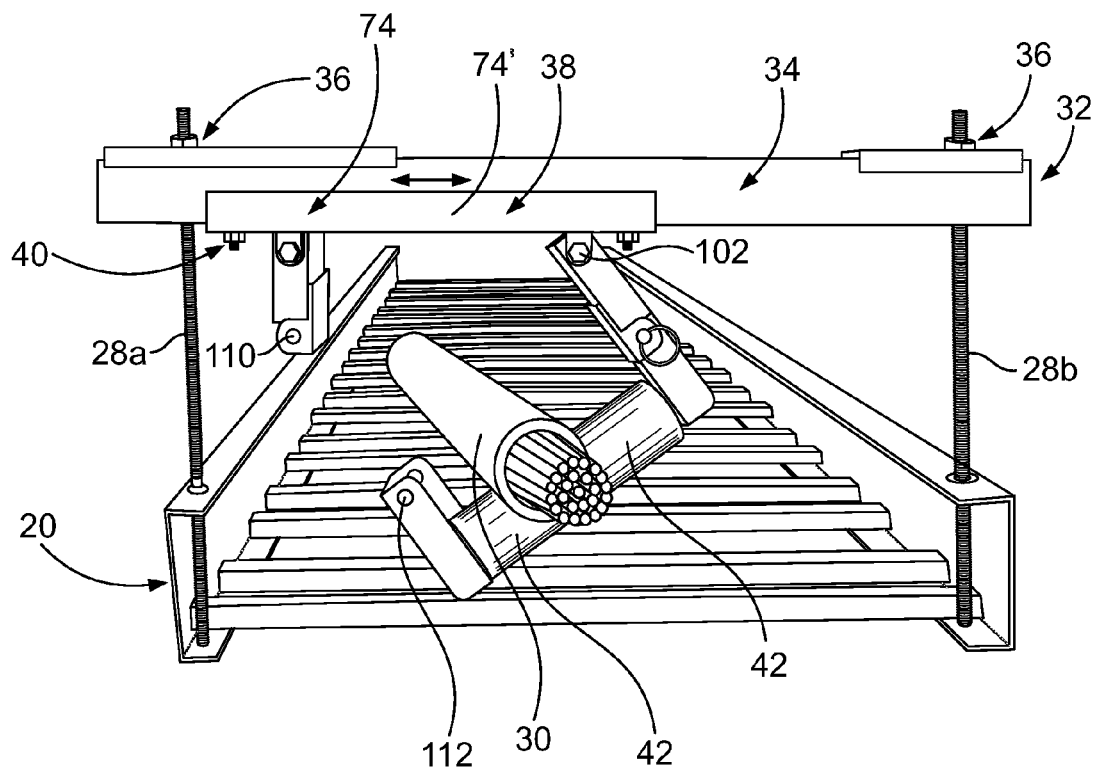
FIG. 10 is a perspective view of an alternate cable roller, cable and cable tray, lowing the cable roller in an open position.

The cable roller 32 provides its mounting above the base 22 of the cable tray 20 using the tray hangers 28a, 28b, rather than mounting the cable roller 32 to the base 22 of the cable tray 20 as was done in the prior art. As shown in FIG. 5, the mounting channel 34 can be directly mounted to the ceiling 128 of a building by suitable fasteners extending through the base wall 44 of the mounting Channel 34 and into the ceiling 128. The position of the cable roller 32 relative to the ceiling 128 can be adjusted as described herein, and the cable roller 32 can be opened and closed as described herein. After the cable 30 is properly located, the cable 30 is attached to the mounting channel 34 by a conventional pipe clamp (not shown) which is mounted in the mounting channel 34. Thereafter, the support assembly 38 and the roller(s) 42 are removed from the mounting channel 34 by decoupling the connector assembly 40. While two support channels 74a, 74b are shown in FIGS. 1-6, a single support channel 74 can be used as shown in FIG. 10 in some applications; this application is not appropriate for a ceiling mounted mounting channel 34 as the central portion 74' of the single support channel 74 would interfere with the installation of the pipe clamp.

The removal of the pins 114, 116 allows either side of the cable roller 32 to drop for easy removal of the cable 30. This speeds the installation and provides a great deal of flexibility in dealing with different cable tray 20 widths and types. The cable roller 32 can also be positioned laterally so the cable 30 is pulled into place directly above its final resting spot. This is an improvement over prior art systems that only have fixed rollers and require more time to position the cable in the cable tray once the pull is completed.

If desired, rollers (not shown) can also be provided on the leg assemblies 86, 88 and/or on legs 106, 108 to aid in cable 30 installation.

The cable 30 may be of a variety of sizes, for example 2.5" in diameter, 3" in diameter. Preferably, there is a 0.5" clearance between the cable roller 32 and the cable 30.

While preferred embodiments of the present invention are shown and described, it is envisioned that those skilled in the art may devise various modifications of the present invention without departing from the spirit and scope of the appended claims.

What is claimed is:

1. A cable roller for use in positioning a cable on a base of a cable tray, said cable roller comprising:
    a mounting channel positioned above the base of the cable tray, said mounting channel having opposite ends and a length defined between said opposite ends;
    a support assembly attached to said mounting channel and extending downwardly from said mounting channel such that said support assembly is between the mounting channel and the base of the cable tray, said support assembly being slideable relative to said mounting channel along at least a portion of said length of said mounting channel; and
    at least one roller attached to said support assembly for allowing the cable to roll over the at least one roller.

2. The cable roller of claim 1, further including a connector assembly for connecting the support assembly and the mounting channel together, said connector assembly including a nut and a fastener, said nut being mounted within said mounting channel and attached to said support assembly, said fastener attached to said nut for capturing said support assembly between said fastener and said mounting channel.

3. The cable roller of claim 1, wherein said support assembly includes a support channel connected to said mounting channel, first and second legs extending downwardly from said support channel, said first leg being hingedly attached to said support channel, and a cross-bar extending between said legs upon which said at least one roller is mounted, said cross-bar being detachable from said second leg.

4. The cable roller of claim 1, wherein said support assembly includes a support channel connected to said mounting channel, first and second legs extending downwardly from said support channel, each said leg being hingedly attached to said support channel, and a cross-bar extending between said legs upon which said at least one roller is mounted, said cross-bar being detachable from said first leg and from said second leg.

5. The cable roller of claim 1, wherein said mounting channel has a pair of elongated slots at each end thereof.

6. The cable roller of claim 1, wherein a plurality of rollers are mounted on said support assembly.

7. A cable roller for use in positioning a cable comprising:
    a mounting channel having opposite ends and a length defined between said opposite ends;
    a support assembly attached to said mounting channel, said support assembly includes a support channel connected to said mounting channel, first and second legs extending downwardly from said support channel, said first leg being hingedly attached to said support channel, and a cross-bar extending between said legs upon which said at least one roller is mounted, said cross-bar being detachable from said second leg; and
    at least one roller attached to said support assembly for allowing the cable to roll over the at least one roller.

8. The cable roller of claim 7, further including a connector assembly for connecting the support assembly and the mounting channel together, said connector assembly including a nut and a fastener, said nut being mounted within said mounting channel and attached to said support assembly, said fastener attached to said nut for capturing said support assembly between said fastener and said mounting channel.

9. The cable roller of claim 7, wherein each said leg of said support assembly is hingedly attached to said support channel, and said cross-bar is detachable from each said leg.

10. The cable roller of claim 7, wherein said mounting channel is mounted on a ceiling of a building.

11. The cable roller of claim 7, wherein said mounting channel is mounted on a cable tray.

12. An assembly for use in positioning a cable comprising:
    a cable tray having a base upon which the cable can be laid and tray hangers extending from the base; and
    a cable roller comprising a mounting channel having opposite ends and a length defined between said opposite ends, said mounting channel being suspended above said base of said cable tray, a support assembly moveably attached to said mounting channel, said support assembly being moveable along at least a portion of said length of said mounting channel, said support channel inducting first and second legs extending downwardly from said support channel, each said leg being hingedly attached to said support channel, and a cross-bar extending between said legs upon which said at least one roller is mounted, said cross-bar being detachable from said first leg and from said second leg, and at least one roller attached to said support assembly for allowing the cable to roll over the at least one roller.

13. The assembly of claim 12, wherein said mounting channel is attached to said tray hangers and said mounting channel has a pair of elongated slots at each end thereof into which said tray hangers are mounted.

14. The assembly of claim 13, further including a coupler assembly for connecting the mounting channel and the tray hangers together, said coupler assembly including a pair of ¼ fasteners mounted on said mounting channel above said respective slot.

15. The assembly of claim 12, further including a connector assembly for connecting the support assembly and the mounting channel together, said connector assembly including a nut and a fastener, said nut being mounted within said mounting channel and attached to said support assembly, said fastener attached to said nut for capturing said support assembly between said fastener and said mounting channel.

16. The assembly of claim 12, wherein said mounting channel is attached to said tray hangers and further including a coupler assembly for connecting the mounting channel and the tray hangers together, said coupler assembly including a ¼ fastener.

17. The assembly of claim 12, wherein said mounting channel is attached to said tray hangers and further including a coupler assembly for connecting the mounting channel and the tray hangers together, said coupler assembly including one of a nut and a clamp attached to each said tray hanger, said mounting channel sitting on top of said coupler assembly.

18. The assembly of claim 12, wherein said mounting channel is mounted on a ceiling of a building.

* * * * *